United States Patent
Hirano et al.

(10) Patent No.: US 8,593,720 B2
(45) Date of Patent: Nov. 26, 2013

(54) ELECTRONIC PAPER AND METHOD FOR PRODUCING SAME

(75) Inventors: Koichi Hirano, Osaka (JP); Masami Nakagawa, Osaka (JP); Seiichi Nakatani, Osaka (JP)

(73) Assignee: Panasonic Corporation, Osaka (JP)

( * ) Notice: Subject to any disclaimer, the term of this patent is extended or adjusted under 35 U.S.C. 154(b) by 192 days.

(21) Appl. No.: 13/383,010

(22) PCT Filed: Apr. 14, 2011

(86) PCT No.: PCT/JP2011/002202
§ 371 (c)(1),
(2), (4) Date: Jan. 9, 2012

(87) PCT Pub. No.: WO2011/142080
PCT Pub. Date: Nov. 17, 2011

(65) Prior Publication Data
US 2012/0113500 A1    May 10, 2012

(30) Foreign Application Priority Data
May 10, 2010   (JP) ............................. P 2010-108177

(51) Int. Cl.
G02B 26/00    (2006.01)
G09G 3/34     (2006.01)

(52) U.S. Cl.
USPC ......................................... 359/296; 345/107

(58) Field of Classification Search
USPC .................. 359/265–275, 296; 345/105, 107
See application file for complete search history.

(56) References Cited

U.S. PATENT DOCUMENTS

| | | | |
|---|---|---|---|
| 7,411,721 B2 * | 8/2008 | Ikeda | ............................ 359/296 |
| 2005/0001810 A1 | 1/2005 | Yakushiji et al. | |
| 2006/0231401 A1 | 10/2006 | Sakurai et al. | |

FOREIGN PATENT DOCUMENTS

| | | |
|---|---|---|
| JP | 61-236585 | 10/1986 |
| JP | 3-13984 | 1/1991 |
| JP | 2003-167274 | 6/2003 |
| JP | 2003-202600 | 7/2003 |
| JP | 2005-17906 | 1/2005 |
| JP | 2009-175259 | 8/2009 |
| WO | 2004/055586 | 7/2004 |

OTHER PUBLICATIONS

International Preliminary Report on Patentability issued Dec. 10, 2012 in International (PCT) Application No. PCT/JP2011/002202, together with English translation thereof.
International Search Report issued May 24, 2011 in International (PCT) Application No. PCT/JP2011/002202.

* cited by examiner

Primary Examiner — Tuyen Tra
(74) Attorney, Agent, or Firm — Wenderoth, Lind & Ponack, L.L.P.

(57) ABSTRACT

Provided is an electronic paper that permits a high-quality, large area to be easily created. Also provided is a method for producing the electronic paper. The electronic paper comprises: a first substrate upon which first electrodes are formed and a second substrate upon which second electrodes are formed, said first substrate and second substrate disposed so as to face each other; and a plurality of cell spaces constituting pixels between said first substrate and second substrate. The first substrate comprises a plurality of first sheet members, each having a first electrode formed thereon. By disposing a cover substrate on said first sheet members, each with a partition wall therebetween, a plurality of subsheet formations comprising the plurality of cell spaces partitioned by the partition walls are formed, and the first electrodes are connected in between adjacent subsheet formations.

20 Claims, 7 Drawing Sheets

ELECTRONIC PAPER AND METHOD FOR PRODUCING SAME

TECHNICAL FIELD

The present invention relates to an electronic paper and a method for producing the same. More specifically, the present invention relates to a display (i.e., electronic paper) that can repetitively display/delete an image by a migration of particles using, for example, static electricity and a method for producing the same.

BACKGROUND ART

An electronic paper as an image display that utilizes a technique of an electrophotoretic method, a particle migration method, or the like has been proposed as an alternative to a liquid crystal display (LCD). In the electronic paper, the migration of particles using the static electricity enables a repetitive display and deletion of an image. The electronic paper has advantages that it realizes a view at wider angles such as an angle close to that of typical printed matters in comparison with the LCD, requires smaller power consumption, and has a memory function. Therefore, the electronic paper draws attention as a low-priced next-generation display (see, for example, Patent Documents 1 to 3).

FIG. 9 shows a basic configuration of the conventional electronic paper 1000. The electronic paper 1000 shown in FIG. 9 includes a pair of opposing substrates (110, 120) wherein at least one of them is a transparent substrate, and partitions 130 which maintain a distance between both substrates (110, 120). Both substrates (110, 120) and the partitions 130 form a cell structure and each space of the cell structure encloses particles having different colors (140A, 140B). A selected distance between the substrate 110 and the substrate 120 is a distance between which particles can migrate and a contrast can be maintained.

More specifically, as shown in FIG. 10, the conventional electronic paper 2000 includes a lower substrate 210, an upper substrate 220, and a partition layer 230 lying between both substrates (210, 220).

The lower substrate 210 includes lower electrodes 214 formed on a surface of a lower sheet member 212 and an insulating layer 216 formed on a surface of a lower sheet member 212 so as to cover the lower electrodes 214. On the other hand, the upper substrate 220 includes an upper electrode 224 formed on a surface of an upper sheet member 222 and an insulating layer 226 formed on the upper sheet member 222 so as to cover the upper electrode 224. The partition layer 230 includes a plurality of partitions 232. Each space between the neighboring partitions 232 is formed into a cell space 250 in which powder particles 240 (240A or 240B) are enclosed.

The partitions 232 of the partition layer 230 serve to keep a gap between the lower substrate 210 and the upper substrate 220. The partitions 232 are formed so as to extend vertically upwardly from the insulating layer 216 covering the lower electrodes 214. A bonding layer 234 is formed on an upper surface of each partition 232. Each partition 232 is connected to the upper substrate 220 through the bonding layer 234.

When voltage (260) is applied to the lower electrodes 214 and the upper electrode 224 in the electronic paper 2000, the powder particles 240 within the cell spaces 250 migrate, thereby displaying an image on the electronic paper 2000. In an example shown in FIG. 10, the positively-charged powder particles 240A migrate toward the lower electrodes 214, whereas the negatively-charged powder particles 240B migrate toward the upper electrode 224.

The electronic paper 2000 is produced in a manner as described below.

Initially, as shown in FIG. 11(a), a substrate structure in which the lower electrodes 214 are formed on the surface of the lower sheet member 212 is prepared. Subsequently, as shown in FIG. 11(b), the insulating layer 216 is formed on the surface of the sheet member 212 so as to cover the electrodes 214. Then, as shown in FIG. 11(c), the partitions 232 are formed on the insulating layer 216.

As shown in FIG. 11(d), after the powder particles 240 (240A, 240B) are filled in each space between the partitions 232, the bonding layer 234 is formed on the surface of each partition 232. Subsequently, as shown in FIG. 11(e), the substrate structure (i.e., upper substrate) including the upper sheet member 222, the upper electrode 224, and the insulating layer 226 is bonded to the bonding layer 234 on each partition 232, thereby obtaining the electronic paper 2000.

PRIOR ART DOCUMENTS

Non-Patent Documents

Patent Document 1: JP-A-2003-202600
Patent Document 2: JP-A-2003-167274
Patent Document 3: International Publication No. WO 2004-055586

DISCLOSURE OF THE INVENTION

Problems to be Solved by the Invention

In view of the above described advantages, expected to the electronic paper is an expansion to the use in an office, for example, as an electronic white board and the use in a digital signage, for example, as an electronic poster in addition to the use in a small area display for a mobile terminal. To realize the above expectation, a display having a large screen area beyond 60 inch is required.

However, an attempt to produce a large screen area electronic paper 2000 based on the structure of the conventional electronic paper 2000 raises the below described problems.

That is, in case the step shown in FIG. 11 is performed, when the lower sheet member 212 becomes larger for the sake of realizing the large screen area of the electronic paper 2000, it becomes extremely difficult to uniformly charge the powder particles 240 into many cell spaces 250. As a result thereof, an incidence rate of generation of failed cells increases. Even in a case where such failed cells are generated only partially, the workpiece thereof is considered as being failed in its entirety. Therefore, with the increase of the screen area, a loss increases in association with the increase of the incidence rate of generation of the failed workpiece according to the increase of the screen area.

When the screen area of the electronic paper 2000 becomes larger, it becomes difficult to handle the sheet. Namely, it becomes difficult to adjust positions between the upper sheet member 222 and the lower sheet member 212 to bond them smoothly and uniformly. According to the increase of the screen area, a size gap between the upper sheet member 222 and the lower sheet member 212 due to a gap of a thermal expansion becomes larger. As a result, accuracy in position adjustment is hardly maintained.

Therefore, in view of the above, there has been a technical limitation or a serious difficulty in increasing the screen area of the conventional electronic paper 2000.

To solve the above problem, a method in which the screen area is increased by arranging electronic papers of a small screen area in an every direction is proposed. However, when independent electronic papers are arranged side by side, a large undisplayable area appears at frame portions thereof. Therefore, there arises a problem that a sense of unity in an image quality and an image is degraded especially when viewing the display at close range.

Thus, an object of the present invention is to provide a high quality electronic paper capable of increasing the screen area and a method for producing the same.

Means for Solving the Problems

The present inventor attempted to solve the problems which disturb the increase of the screen area of the above described electronic paper with an idea different from the conventional ones, i.e., without addressing the problem in an extension of the conventional technique.

More specifically, the electronic paper according to the present invention is directed to an electronic paper including a first substrate on which a first electrode is formed and a second substrate on which second electrodes are formed, the first substrate and the second substrate facing to each other, and a plurality of cell spaces which form pixels between the first substrate and the second substrate:

wherein the first substrate is divided into a plurality of first sheet members such that each first sheet member includes a portion of the first electrode and a covering substrate provided above the first sheet member via partitions which separate cell spaces, thereby forming a plurality of sub-sheet structures in which the portion of the first electrode is connected to the portion of the first electrode of the neighboring sub-sheet structure.

In each sub-sheet structure, the partition layer is preferably formed integrally with the partitions.

In each sub-sheet structure, the first electrode may be provided so as to extend to the outside of the partition layer and the first electrode extended to the outside of the partition layer may be connected to the first electrode of the neighboring sub-sheet structure.

In each sub-sheet structure, the first substrate preferably has an area larger than that of the covering substrate.

The first electrode extending to the outside of the partition layer may be bent to a side opposite to the second substrate and the first electrode extended to the outside of the partition layer may be connected to the first electrode of the neighboring sub-sheet structure through the bent portion.

Between the neighboring sub-sheet structures, a distance between the partition layer of one sub-sheet structure and the partition layer of the other sub-sheet structure is preferably set to a value within a range 2 to 5 times as a thickness of the first substrate.

Between the neighboring sub-sheet structures, the first electrodes may be electrically connected to each other via conductive particles or a metal.

The second substrate is preferably made of a single piece of substrate sheet having translucency.

The covering substrates are preferably made of a material having the translucency.

The first substrate, the second substrate, and the covering substrates are preferably made of a flexible substrate, respectively.

Preferably, the first electrodes and the second electrodes are wired in parallel, respectively, and are orthogonal to each other.

A method for producing an electronic paper according to the present invention includes:

a step (A) of forming the sub-sheet structures, the step (A) including the following steps (a1) to (a4):

a step (a1) of preparing a plurality of sheet members is prepared and forming a first electrode on a main surface of each sheet member, thereby preparing the first sheet members;

a step (a2) of forming partitions which form a plurality of cell spaces on one surface of each first sheet member;

a step (a3) of charging powder particles into cell spaces enclosed by each first sheet member and the partitions; and a step (a4) of enclosing the charged powder particles within the cell spaces such that the covering substrate is bonded above the corresponding first sheet member via the partitions;

a step (B) of preparing a second substrate including second electrodes formed thereon and arranging the plurality of sub-sheet structures thereon side by side such that the covering substrates of the sub-sheet structures face to the second substrate; and a step (C) of electrically connecting the first electrode of the sub-sheet structure to the first electrode of the neighboring sub-sheet structure.

The method for producing the electronic paper according to the present invention may include the step (B) after the step (C) or the step (B) before the step (C).

Preferably, the step (a2) further includes forming a partition layer including the partitions integrally formed on the partition layer.

Preferably, the step (A) further includes forming each first electrode so as to extend to the outside of the partition formed outermost position and the step (C) further includes electrically connecting the outwardly extending first electrode to the first electrode of the neighboring sub-sheet structure.

The step (A) still further includes arranging each covering substrate such that end portions of the covering substrate are positioned inside the outwardly extending first electrode and the step (C) still further includes bending a portion of each first sheet member positioned outside the end of the covering substrate may be bent in a side opposite to the second substrate and the first electrode may be electrically connected to the first electrode of the neighboring sub-sheet structure through the bent portion.

The step (B) further includes arranging the plurality of neighboring sub-sheet structures side by side on the second substrate with the connecting portions formed on the sub-sheet structures being bent to the outside.

The step (B) still further includes arranging the plurality of sub-sheet structures side by side on the second substrate with an electrically-conductive adhesive member being applied to the connecting portion and with the connecting portion being bent outwardly.

The step (B) preferably includes arranging the sub-sheet structures such that a distance between the neighboring sub-sheet structures becomes a value 2 to 5 times as a thickness of the first sheet member.

Effects of the Invention

The electronic paper according to the present invention is divided into a plurality of first sheet members such that each first substrate includes a portion of the first electrode, a covering substrate is provided above each first sheet member via partitions which isolate the cell spaces to thereby form the plurality of sub-sheet structures, and the portion of the first electrode is connected to a portion of the first electrode of the neighboring sub-sheet structure.

Therefore, handling of the partition layers enclosing the powder particles therein and a positional adjustment between the first electrodes and the second electrodes become easy and a size matching accuracy can be improved. Undisplayable portion that appears between the partition layers can be minimized by establishing electrical connection between the first electrodes formed on the plurality of first substrates, and a sense of unity in an image quality and an image is not impaired by making the second substrate planar. Accordingly, the high quality electronic paper of which screen area can be increased with ease can be realized.

MODE FOR CARRYING OUT THE INVENTION

Figure 1:
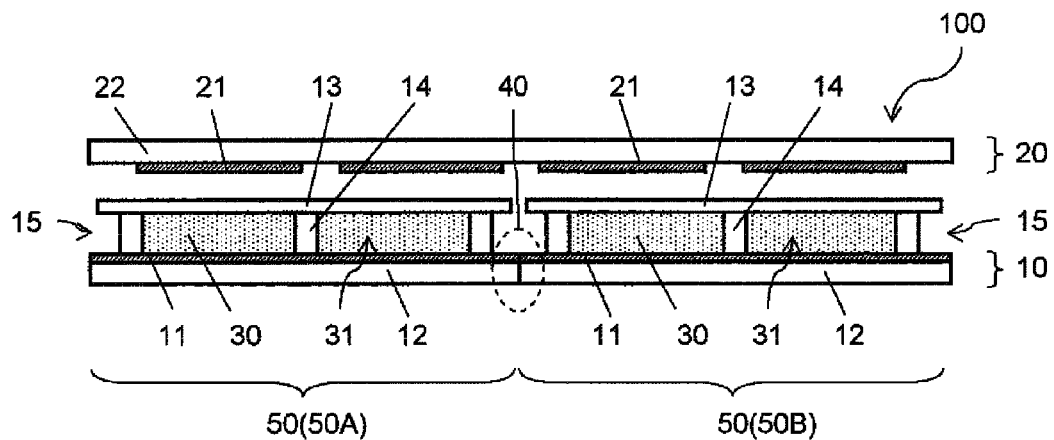
FIG. 1 is a cross sectional view schematically illustrating a configuration of an electronic paper 100 of the first embodiment according to the present invention.

The electronic paper according to the present invention is directed to an electronic paper in which a plurality of M pixels are formed between 2 substrates, each including an electrode formed thereon, wherein one of the 2 substrates is formed into a sub-sheet structure and a plurality of m (m=M/n:n is the number of sub-sheets) pixels are formed to be combined with the other one of the substrates.

Accordingly, a screen area of the electronic paper according to the present invention can be increased without widening an undisplayable area between the sub-sheet structures.

In other words, in the conventional method for increasing the screen area in which the plurality of conventional electronic papers are arranged in every direction, since each electronic paper includes frame portion formed therewith, so that the undisplayable area that appears between the electronic papers arranged in every direction becomes larger. However, the electronic paper according to the present invention has no such disadvantage.

Embodiments of the present invention will be described below with reference to the accompanying drawings. In the following drawings, components actually having the same functions are provided with the same reference numerals and/or symbols for the sake of simple description. The present invention is not limited to the following embodiments.

First Embodiment

FIG. 1 is a cross sectional view schematically illustrating a configuration of an electronic paper 100 according to the first embodiment of the present invention. In FIG. 1, for the sake of easy understanding of the configuration, sub-sheet structures 50 and a second substrate 20 are shown in a separated manner. However, the sub-sheet structures 50 and the second substrate 20 are actually bonded to each other.

The electronic paper 100 of the first embodiment includes the sub-sheet structures 50, each including a first substrate 10 on which a first electrode 11 is formed, a covering substrate 13, a partition layer 15 including partitions 14 provided between the first substrate 10 and the covering substrate 13, and a second substrate 20 on which second electrodes 21 are formed.

More specifically, the first substrate 10 includes a plurality of first sheet members 12, each including the first electrode 11 formed thereon, and the covering substrates 13 provided via partitions 14 above the first sheet members 12, thereby forming the sub-sheet structures (50A, 50B) per a unit of the first sheet member 12. Further, in each sub-sheet structure 50, partitions are provided such that a plurality of pixels is formed. In the first embodiment, each partition layer 15 is formed integrally with the partitions 14.

In each sub-sheet structure 50, the partition layer 15 is positioned between the first substrate 10 and the second substrate 20 and the first electrode 11 of the sub-sheet structure 50A is connected to the first electrode of the sub-sheet structure 50B through a connecting portion 40 in the plurality of sub-sheet structures 50A and 50B.

In the first embodiment, each first substrate 10 includes, as described above, a collective entity of a first sheet member 12 having flexibility and the first electrode 11 formed on a surface of the first sheet member 12. Although it is not shown in FIG. 1, an insulating film is provided on the first electrode 11 in order to electrically separate powder particles 30 to be enclosed from the first electrode 11. The first sheet member 12 is made of, for example, a polyethylene terephthalate (PET) film and a polyethylene naphthalate (PEN) film. The first electrode 11 is made of, for example, a conductive wiring material such as a copper foil and an aluminum foil.

The covering substrate 13 in each sub-sheet structure 50 is made of a translucent material. Specifically, an extremely thin transparent film having a thickness of a range from 4 to 5 micron is preferably used as the covering substrates 13 in view of maintenance of permeability and/or a reduction of a driving voltage.

The powder particles 30 are enclosed in each space between the neighboring partitions 14 in the partition layer 15. In other words, the powder particles 30 are enclosed in each cell space 31 walled by the first substrate 10, the covering substrate 13, and the partitions 14. The powder particles 30 are charged image display particles. For example, each powder particle 30 is made of a round resin ball coated with carbon (black), titanium oxide (white), or the like. Selection of an appropriate material for the use of coating enables coloring of the powder particles 30 in any colors.

In the first embodiment, the second substrate 20 is made of a single piece of substrate sheet and does not include a collective entity of a plurality of sheet members as in the case of the first substrate. More specifically, the second substrate 20 includes a second sheet member 22 having flexibility and second electrodes 21 formed on a surface of the second sheet member 22. The second substrate 20 is arranged at a side of a displaying surface of the electronic paper 100 and made of a material having translucency. For example, the second sheet member 22 is made of the translucent material such as polyethylene terephthalate (PET) film or polyethylene naphthalate (PEN) film for the optical use. Each second electrode 21 is made of a transparent electrode (e.g., ITO film electrode and IZO film electrode).

The shown first electrodes 11 and the second electrodes 21 are first pixel electrodes and second pixel electrodes, respectively, for the use in migration of the powder particles 30 in the sub-sheet structures 50. In the electronic paper of the first embodiment, the powder particles 30 migrate toward a side of the first substrates 10 or migrate toward a side of the covering substrates 13 according to a difference in potential between the first pixel electrodes 11 and the second pixel electrodes 21. The first substrates 10 and the covering substrates 13 are made of a dielectric material. When a voltage is applied between the first pixel electrodes 11 and the second pixel electrodes 21, thus charged powder particles 30 migrate due to electric charge induced by the first substrates 10 and the covering substrates 13.

The plurality of sub-sheet structures 50 of the first embodiment are arranged two-dimensionally neighbored such that the partition layers 15 of the sub-sheet structures 50 lie in the same plane. In the example shown in FIG. 1, shown is a cross sectional view of a portion where two pieces of sub-sheet structures 50 (50A and 50B) are positioned facing to the second substrate 20. Needless to say, the number of 2, 3, 4, or 6 (or more) pieces of sub-sheet structures 50 may be arranged with respect to a single piece of second substrate 20.

In each sub-sheet structure 50 of the present embodiment, a connecting portion 40 of the first electrode 11 is formed at an outside of a portion where the partition layer 15 of the first substrate 10 is formed and is electrically connected to the neighboring connecting portion 40. In each sub-sheet structure 50 of the present embodiment, an area of the first substrate 10 is larger than an area of the covering substrate 13. Accordingly, even in a case where the neighboring first electrodes 11 are connected to each other through the connecting portion 40, the neighboring partition layers 15 can be arranged such that they do not overlap to each other but they neighbor two-dimensionally.

An area of each first substrate 10 is preferably larger than an area of the corresponding covering substrate 13 as far as the neighboring partition layers 15 do not overlap to each other and the neighboring first electrodes 11 are connected to each other through the connecting portion 40. Accordingly, the screen area can be increased without inviting an unnecessary large sized undisplayable area of each sub-sheet structure.

In the electronic paper 100 of the first embodiment having the above described configuration, the plurality of sub-sheet structures 50 are arranged with respect to the single piece of the second substrate 20 in a corresponding manner, so that handling of the partition layers 15 which contain powder particles 30 therein and a position adjustment between the first electrodes 11 and the second electrodes 21 become easier and the size matching accuracy can be improved. Further, the first electrodes can be connected to each other between the neighboring sub-sheet structures 50 such that undisplayable portion that appears between the partition layers of the neighboring sub-sheet structures 50 is minimized. As a result thereof, the sense of unity in the image quality and the image is not impaired. Further, a high quality large screen electronic paper can be realized in which the second substrate can be made planar with ease (i.e., it is difficult to connect a large sized sub-sheet structures to each other while keeping a planarity thereof) and the sense of unity in the image quality and the image is not impaired.

Second Embodiment

A description is made below as to an electronic paper of a second embodiment according to the present invention.

Figure 2:
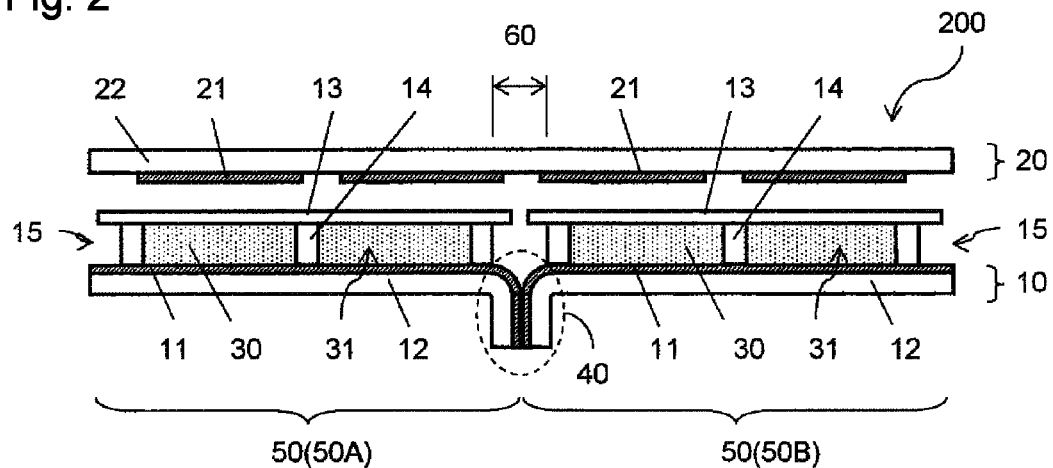
FIG. 2 is a cross sectional view schematically illustrating a configuration of an electronic paper 200 of a second embodiment according to the present invention.

FIG. 2 is a cross sectional view schematically illustrating a configuration of an electronic paper 200 according to the second embodiment. As shown in FIG. 2, in the second embodiment, an example of a specific configuration of the connecting portion in the electronic paper of the first embodiment is described. In also FIG. 2, for the sake of easy understanding of the configuration, the sub-sheet structures 50 and the second substrate 20 are shown in a separated manner.

As shown in FIG. 2, in the second embodiment, the connecting portion 40 of the first substrates 10 are bent outwardly (i.e., a side opposite to the second substrate) to electrically connect the two pieces of the sub-sheet structures 50A and 50B each other.

More specifically, in each of the sub-sheet structures 50A and 50B, the first electrode 11 is extended to the outside of the partition layer 15 and the outwardly extended first electrode 11 is bent downwardly together with an end portion of the first substrate 10, thereby forming the connecting portion in each of the sub-sheet structures 50A and 50B. Then, the first electrode 11 at the connecting portion of the sub-sheet structure 50A is connected to the first electrode 11 at the connecting portion of the sub-sheet structure 50B.

Since no powder particles 30 are enclosed within a space above the connecting portion 40 positioned between the partition layers 15 of the sub-sheet structures 50A and 50B, the space cannot be used as a pixel area. However, with the configuration of the second embodiment, a distance 60 between the partition layers 15 can be set to a value equal to or less than a pitch between electrodes of the first electrodes 11 and the second electrodes 21 and also can be set to a value narrower than a distance between the neighboring partitions (i.e., pixel size) within the partition layers 15. Therefore, in also a case where the plurality of sub-sheet structures 50 are arranged so as to be two-dimensionally neighbored (i.e., so as to be positioned on the same plane), the sense of unity in the image quality and the image is not impaired and a high quality display can be realized.

The distance 60 between the partition layers 15 preferably is a value equal to or less than 10 times, more preferably, 2 to 5 times, as a thickness of each first substrate 10.

Figure 3:
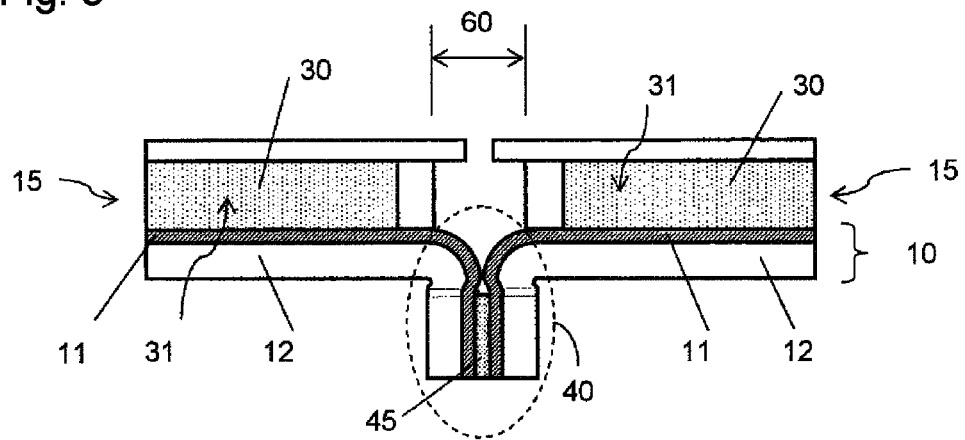
FIG. 3 is a cross sectional enlarged view illustrating a configuration of a connection portion 40 in FIG. 2.

FIG. 3 is a cross sectional view enlarging an adjacent portion of the connecting portion 40 of the electronic paper 200 shown in FIG. 2 according to the second embodiment of the present invention. In FIG. 3, for the sake of easy understanding of the configuration, illustration of the second substrate is omitted. In the connecting portion 40 of FIG. 3, the first electrodes 11 of the neighboring first substrates 10 are electrically connected to each other through conductive particles or a metal 45. With the connecting method, strength of the connecting portion 40 can be retained satisfactory without widening the distance 60 between the partition layers 15, thereby being capable of gaining good connection reliability. As the conductive particles or the metal 45, at least one metal selected from gold, silver, copper, nickel, palladium, tin, and solder may be used. Alternatively, various metals such as an alloy made of more than two metals selected from the above described metals may be used. However, the solder is preferable to be used in the present invention. As the conductive particles, for example, particles made of the metal or the alloy selected from the above metals, carbon particles, and resin particles coated with the metal or the alloy may be used. The conductive particles are preferably used after being dispersed in the resin. This is for the purpose of improving the strength and the reliability of the connecting portion 40.

Now, a further description is made below as to the entire configuration of the electronic paper of the second embodiment with reference to FIGS. 4 through 6.

Figure 4:
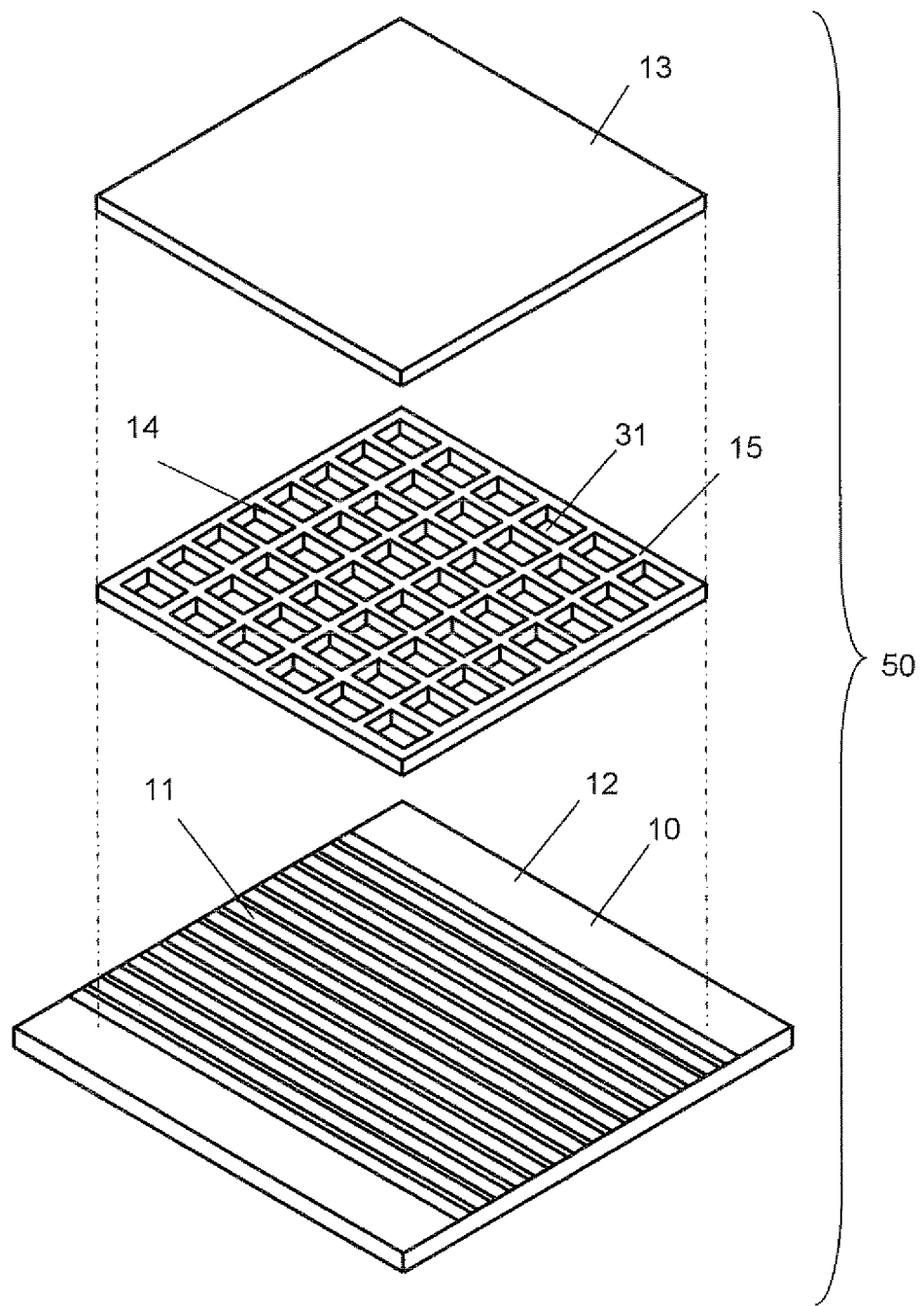
FIG. 4 is an exploded perspective view of a sub-sheet structure 50 of the second embodiment.

FIG. 4 is an exploded perspective view illustrating a configuration of the sub-sheet structure 50 of the present embodiment. As shown in FIG. 4, the sub-sheet structure 50 is configured such that the partition layer 15, including partitions 14 for forming the cell spaces 31, is integrally formed with the partitions 14 arranged in a reticular pattern and the partition layer 15 is sandwiched between the first substrate 10 from the bottom and the covering substrate 13 from the top. Each cell space 31 is charged with the powder particles 30. In the cell spaces 31, an insulating film (not shown) is formed in order to electrically insulate the first electrode 11 from the powder particles 30. The insulating film may be formed such that, for example, the insulting film is formed on the first substrate 10 so as to cover the first electrode 11 and the partition layer 15 is formed on the insulting film.

The pitches of the cell spaces 31 are set to, for example, a range from about 0.5 μm to about 1 mm. The partition layer 15 has a thickness (i.e., height of the partition 14) of a range, for example, from 40 μm to 50 μm. A length of a side of the partition layer 15 (or the covering substrate 13) is in a range, for example, from 10 cm to 30 cm. A size or a shape of the partition layer 15 can be set to a 30 cm square size or a A4 size. The side of the partition layer 15 can be set to 10 cm or 50 cm. However, in view of the productivity (e.g., handling ability) in production, the preferable size of the partition layer 15 is, for example, the 30 cm square size or the A4 size.

Figure 5:
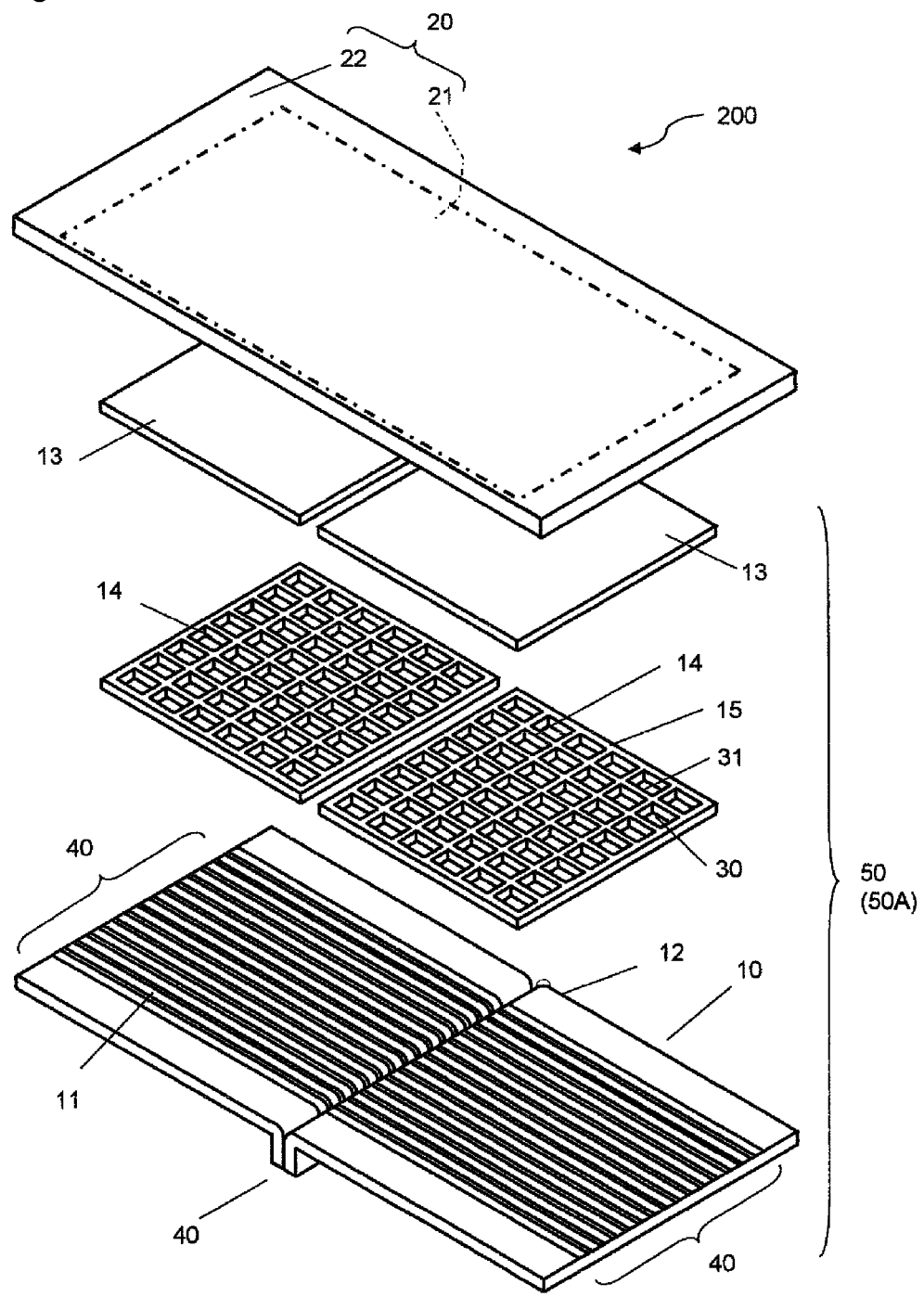
FIG. 5 is an exploded perspective view of the electronic paper 200 including two sub-sheet structures 50 in the second embodiment.

FIG. 5 is an exploded perspective view illustrating a configuration of the electronic paper 200 including two pieces of sub-sheet structures 50 (50A). The configuration of the electronic paper 200 of the embodiment in which the plurality of sub-sheet structures 50 (50A) is arranged with respect to a single piece of the second substrate 20 and a method for producing the same are described below with reference to FIG. 5.

In FIG. 5, an example in which two pieces of sub-sheet structures 50 (50A) are arranged with respect to a single piece of the second substrate 20 is shown. However, needless to say, two or more pieces of the sub-sheet structures 50 (50A) may be arranged with respect to the single piece of the second substrate 20 in the same manner as described above and the electronic paper having such configuration may be produced according to the same producing method. Alternatively, a plurality of sub-sheet structures 50 (50A) arranged two-dimensionally may be arranged with respect to the single piece of the second substrate 20.

In the present producing method, the first substrate (i.e., lower substrate) 10 on which the first electrodes 11 are formed are initially prepared. Here, the first electrodes 11 are pixel electrodes formed on the sheet-members 12. In this example, each first electrode 11 is configured such that a strip shaped electrode extending corresponding to a single line of a pixel area is provided to every separated line and both end portions of the first electrode 11 exposed from the insulating film (not shown) that insulates the first electrode 11 from the powder particles 30 are connected to the corresponding line of the first electrode 11 of the neighboring first substrate (i.e. lower substrate) 10, thereby forming the connecting portion.

More specifically, an insulating film (not shown) that insulates the first electrodes 11 from the powder particles 30 is formed at a position where the partition layers 15 on the first substrate 10 are formed so as to cover the first electrodes 11 and the first electrodes 11 positioned outside the insulating film are precoated with the solder. This precoating is performed by, for example, forming a soldering paste by a screen printing.

Then, the partition layers 15 are arranged on the first substrate 10. Here, although the sub-sheet structures 50 are shown in a separated manner, the sub-sheet structures 50 is configured such that the partition layers 15 are sandwiched between the first substrate 10 and the covering substrates 13. The partition layers 15 are formed such that, for example, a photosensitive resist is laminated on the insulating layer that covers the first electrodes 11. The resist is exposed, developed, and etched to form the partition layers 15. The partition layers 15 may be formed such that, instead of a method using the resist, paste for forming the partitions is provided according to screen printing to be subjected to thermosetting so as to form the partition layers 15. Each partition layer 15 is configured such that a width of the pixels in a line direction is narrower than a width of each sheet member 12 and shorter than a length of each first electrode 11. When each partition layer 15 is arranged on the corresponding first substrate 10, both end portions of each first electrode 11 expose to the outside of the partition layer 15. Thus exposed both end portions of each first electrode 11 are pre-coated with the solder. Each partition layer 15 includes cell spaces 31 which are defined by partitions 14 and arranged in matrix. The powder particles 30 are charged into the cell spaces 31. More specifically, after each partition layer 15 is connected to the first substrate 10, the powder particles 30 are charged into cell spaces 31 and subsequently the covering substrate 13 is bonded on an upper surface of the partition layer 15 to close the cell spaces 31.

In the above described example, the insulating layers that cover the first electrodes 11 and the partition layers 15 are configured separately. However, the present invention is not limited thereto, but a configuration that, for example, the partition layers are integrally formed with the insulating layers can also be employed. The partition layers integrally formed with the insulating layers which separate the first electrodes 11 from the powder particles 30 may be configured such that, for example, a photosensitive resist that covers the first electrodes 11 is laminated onto the first substrate 10 and the resist is exposed, developed, and etched such that the resist remains on the first electrodes 11 to thereby form concaved cell spaces 31.

In a case where the cell spaces 31 of the sub-sheet structures 50 correspond to a single pixel area, the partition layers 15 of the sub-sheet structures 50 are arranged on the first substrate 10 such that positions of the cell spaces 31 correspond to positions of the first electrodes 11. Further, in a case where the plurality of cell spaces 31 are included in a single pixel area, the plurality of cell spaces 31 are arranged so as to correspond to a single first electrode 11.

Then, the second substrate (upper substrate) 20 on which the second electrode 21 is formed is prepared and the sub-sheet structures 50 are arranged on the second substrate 20. Subsequently, the partition layers 15 are arranged so as to be sandwiched between the first substrate 10 and the second substrate 20 in a manner they are opposed to each other. The second electrode 21 is a pixel electrode and formed on the sheet member 22 (a rear surface of the sheet member 22 in FIG. 5). In the example, the second electrode 21 is formed into a strip shaped electrode that extends corresponding to the lines of the pixel area.

The first electrodes 11 of the plurality of sub-sheet structures 50 are electrically connected to each other through the connecting portions 40. Examples of the electrically connecting method include a method in which a liquid thermosetting resin composition containing the conductive particles dispersed therein is applied to the connecting portion 40 to heat and pressurize the first electrodes 11 each other, a method in which a sheet-like thermosetting resin composition containing the conductive particles dispersed therein is disposed in the connecting portion 40 to heat and pressurize the first electrodes 11 each other, and a method in which a paste composition containing a low melting metal such as solder is applied to the connecting portion 40 to heat the first electrodes 11 so as to cause them to metal-contact each other. Portions of the connecting portions 40 having no neighboring sub-sheet structure 50 are electrically connected to external connection terminals (not shown).

As described above, the second substrate 20 and the plurality of sub-sheet structures 50 are laminated to each other and the first electrodes 11 of the plurality of sub-sheet structures 50 are electrically connected to each other, thereby being able to complete the electronic paper 200 of the present embodiment.

In FIG. 5, the electronic paper 200 including 2 pieces of the sub-sheet structures 50 is exemplified. However, 3, 4, 6 or more sub-sheet structures 50 can be arranged by using the same method, so that at least the area of the second substrate 20 may be at least two times as the area of the sub-sheet structures 50. Further, as shown in FIG. 5, the sub-sheet structures 50 also can be arranged in parallel in addition to in series only in a direction of wiring of the first electrodes 11. The number of sub-sheet structures 50 and the configuration thereof may be formed into any suitable ones for the ease of producing the sub-sheet structures 50 and according to a screen size. The sub-sheet structures 50 can be preliminary produced in a separate step and thus can be preliminary prepared, so that only sub-sheet structures 50 of which goodness having been confirmed in the test can be arranged on the second substrate 20. In addition to the above, in a case where the electronic paper 200 having a large-sized screen is produced, since only the sub-sheet structures 50 of the necessary number are to be arranged, a difficulty associated with the increase of the screen area in producing the electronic paper 200 can be reduced.

In the method of producing the electronic paper 200 shown in FIG. 5, such a configuration may also be employable that the first electrodes 11 of the plurality of sub-sheet structures 50 are electrically connected each other through the connection portions 40 and thereafter the plurality of sub-sheet structures 50 having been electrically connected to each other are arranged on the second substrate 20, thereby arranging the partition layers 15 such that the partition layers 15 are sandwiched between the first substrates 10 and the second substrate 20 which are facing to each other. In this case, the connection of the first electrodes 11 through the connecting portion 40 can be established with ease.

As shown in FIG. 5, when each sub-sheet structure 50 is formed, it is preferable that the area of each partition layer 15 is made smaller than the area of each first substrate 10 and the connecting portion 40 is formed outside the partition layer 15. For example, it is preferable that a width of each partition layer 15 is made shorter than a length of each of the first electrodes 11 that are arranged side by side in a strip shape and thereby the first electrode 11 is exposed outside the both ends of the partition layer 15 to form the connecting portions 40. It is further preferable that, when the sub-sheet structures 50 are arranged facing to the second substrate 20, the first electrodes are electrically connected through the connecting portion 40 having been bent outwardly.

According to the preferable embodiment, a distance between the partition layers 15 can be reduced up to about a value two times as the thickness of the first substrate 10. Therefore, a high quality display can be realized without causing impairment of the sense of unity in the image quality and the image.

In the method of producing the electronic paper 200 shown in FIG. 5, the plurality of sub-sheet structures 50 may be arranged on the second substrate 20 and the partition layers 15 are arranged such that the partition layers 15 are sandwiched between the first substrate 10 and the second substrate 20 facing to each other. At the same time, the first electrodes 11 of the plurality of sub-sheet structures 50 are electrically connected to each other through the connecting portions 40. Preferable electrical connection between the neighboring first electrodes is established in a manner as described below. Namely, for example, when the sub-sheet structures 50 are arranged facing to the second substrate 20, the plurality of sub-sheet structures 50 are arranged on the second substrate 20 while the connecting portion 40 in which the conductive connecting member is formed on each of the first electrodes 11 is bent. The above configuration is preferred in that the number of steps can be reduced.

Figure 6:
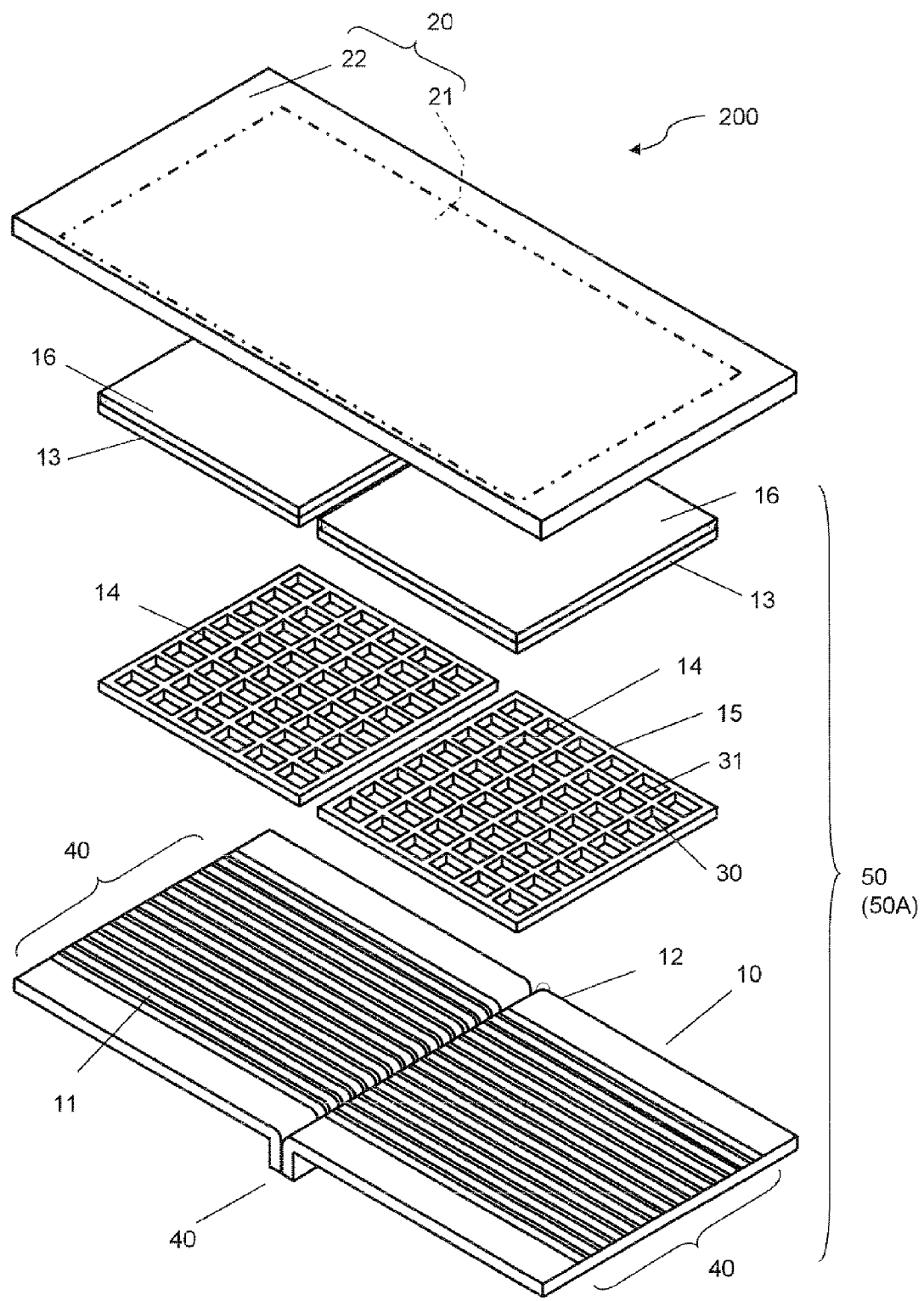
FIG. 6 is an exploded perspective view illustrating a modification example of the electronic paper 200 of the second embodiment according to the present invention.

FIG. 6 shows an embodiment in which bonding layers 16 are laminated on upper surfaces of the covering substrates 13. With the configuration, a laminating step can be executed only by laminating the sub-sheet structures 50 on the second substrate 20. It is also possible to modify the step such that the bonding layers 16 are laminated on a bottom surface of the second substrate 20.

In each of the above described embodiments, it is preferable that the first electrodes 11 and the second electrode 21 include wirings, respectively, arranged in parallel and are orthogonal to each other. This is because an image display according to a passive matrix operation becomes easy.

In each of the embodiments of the electronic paper according to the present invention, adhesive may be charged in a gap between a plurality of partition layers 15. In this case, the adhesive can bond the first substrate 10 with the second substrate 20, so that preferred is a point that the strength of the electronic paper improves and the connecting portions can be protected from stresses generated by curving or bending thereof. As the adhesive, for example, a silicone-based adhesive and a urethane-based adhesive can be used.

In each embodiment of the electronic paper of the present invention, the display method according to the migration of the powder particles is described above. However, any similar configuration may be employed for the display portion. Even in a case where, for example, the powder particles are dissolved in liquid, a similar configuration is employable and an equivalent effect can be produced.

In each of the above described embodiments, the first substrate 10, the second substrate 20, and the covering substrates 13 are preferably made of a flexible substrate. In each embodiment of the electronic paper according to the present invention, a reinforcing material, an antireflective material, a brightener, and an electromagnetic shielding material may be arranged outside the first substrate and/or the second substrate. The above materials are not necessarily flexible.

Figure 7:
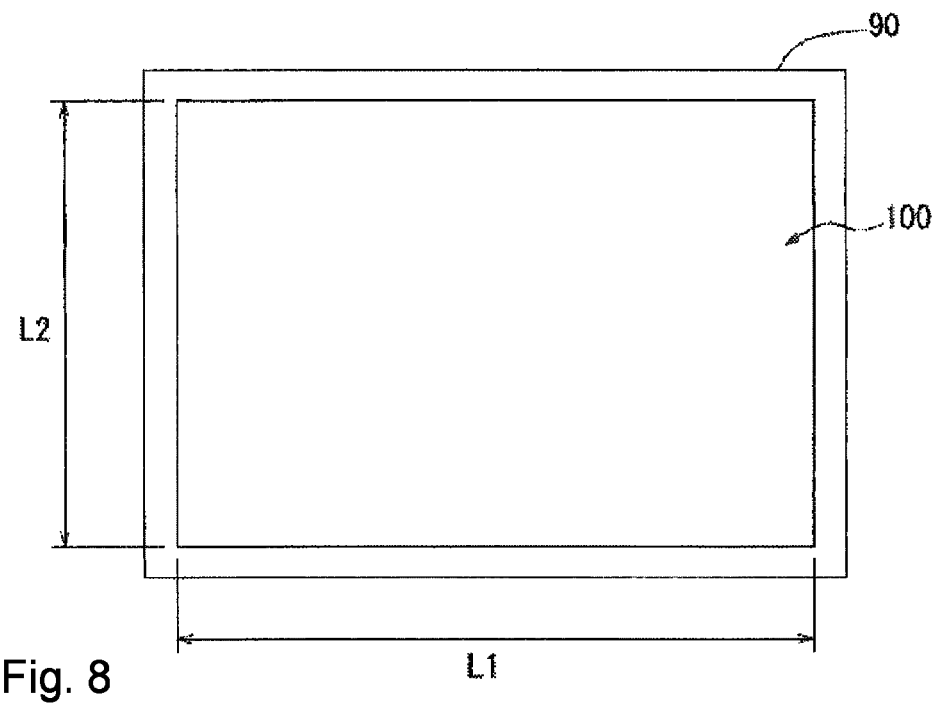
FIG. 7 is a schematic view illustrating one embodiment of the electronic papers 100 and 200 according to the present invention.

The electronic paper 100 of the present embodiment can be made into an image display including a housing 90 as shown in FIG. 7. In this case, the electronic paper 100 can be configured to be a A5 size, a A4 size, or a A3 size. However, in view of the feature of the sub-sheet structures 50, constructing into a large-sized screen electronic paper 100 is more preferable. For example, the electronic paper 100 having a length of a side (here, a longer side L1) of equal to or more than 1 m (i.e., large-sized screen display) also can be constructed. In the configuration of the present embodiment, the electronic paper 100 can be produced by using the sub-sheet structures 50, so that the large-sized screen display can be produced with low cast. Therefore, the electronic paper 100 is suitable in the use of, for example, large-sized screen advertisement publicity.

Figure 8:
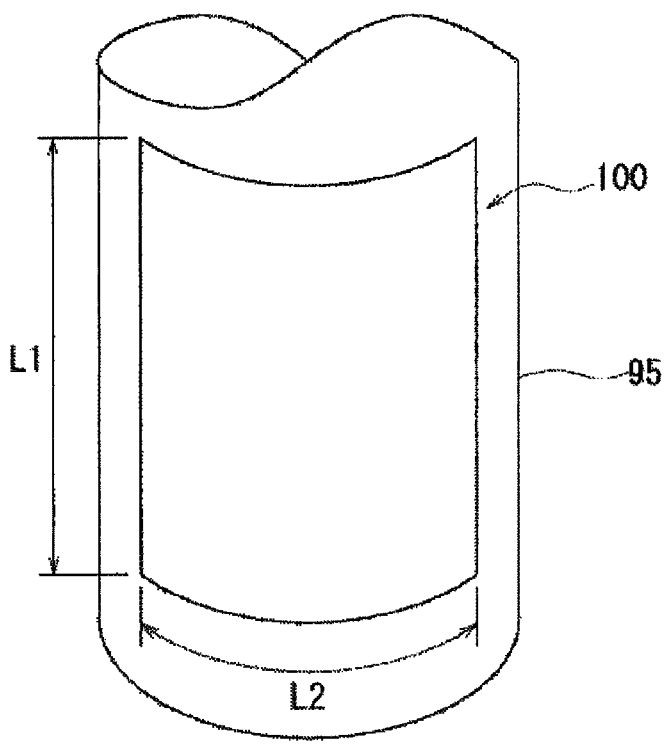
FIG. 8 shows an example of the electronic papers 100 and 200 according to the present invention when they are used in a display for publicity.
Figure 9:
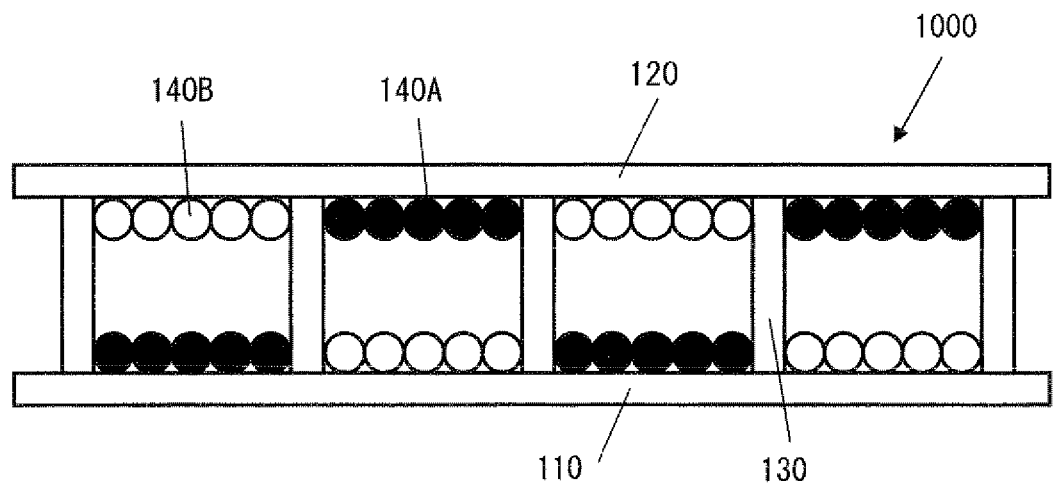
FIG. 9 is a cross sectional view illustrating a configuration of the conventional electronic paper.
Figure 10:
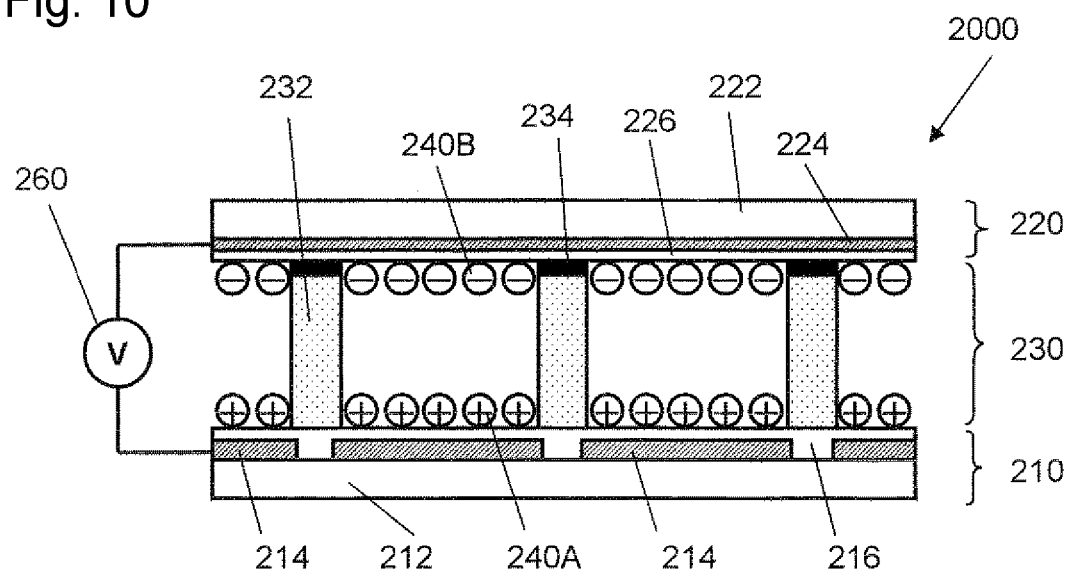
FIG. 10 is a cross sectional view illustrating a configuration of an electronic paper 2000.
Figure 11A:
FIG. 11 is a cross sectional view of each step illustrating a method for producing the electronic paper 2000.
Figure 11B:
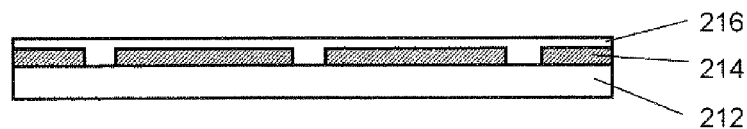
Figure 11C:
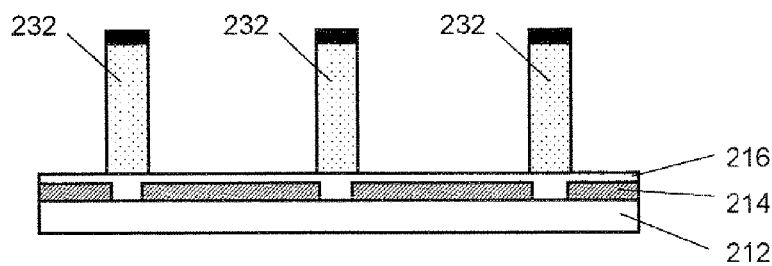
Figure 11D:
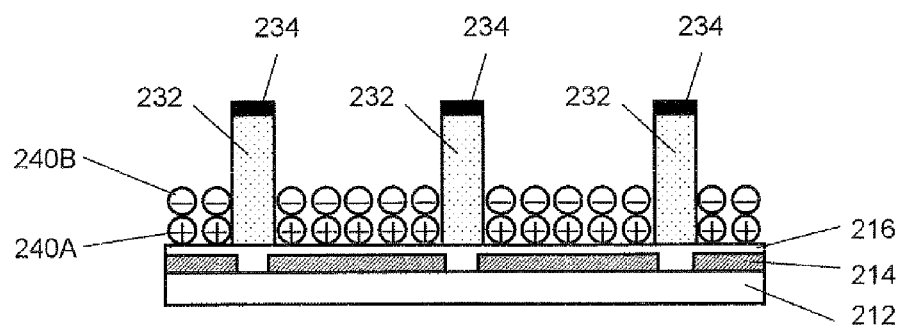
Figure 11E:
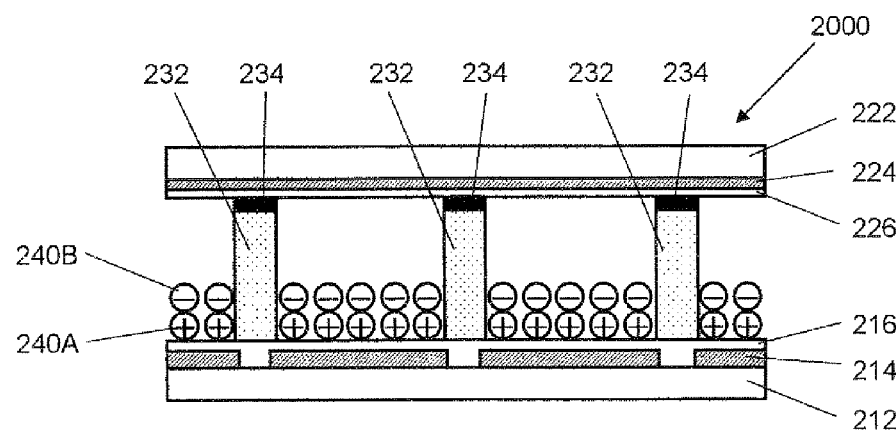

In a case where, as shown in FIG. 8, the electronic paper 100 of the present embodiment has flexibility, the electronic paper 100 can be used as a display in use of the advertisement publicity attached to a surface of a circular column 95. In a case where both of the lower substrate 10 and the upper substrate 20 are made of a flexible substrate, the electronic paper 100 has the flexibility, so that the electronic paper 100 is bendable. Here, it is possible to set the longer side L1 of the electronic paper 100 to a value equal to or more than 1 m. A shorter side L2 may be a value equal to or less than 50 cm. In the electronic paper 100 of the present embodiment, the first substrate 10, the second substrate 20, and the covering substrates 13 can be made of the flexible substrate, so that it is suitable to use the electronic paper 100 in also an occasion where the electronic paper 100 needs to be bent.

While the invention has been described above by way of preferred embodiments, these are not to be considered as limiting and, as a matter of course, various modifications can be made.

INDUSTRIAL APPLICABILITY

According to the present invention, it is possible to provide an electronic paper capable of increasing an area of a screen with ease while securing a high quality.

DESCRIPTION OF REFERENCE SYMBOLS

10: First substrate (lower substrate)
11: First electrode
12: Sheet member
13: Covering substrate
14: Partition
15: Partition layer
16: Bonding layer
20: Second substrate
21: Second electrode
22: Sheet member
30: Powder particle
31: Cell space
40: Connecting portion
45: Conductive particle or metal
50: Sub-sheet structure
60: Distance between partition layers
90: Housing
95: Circular column
100, 200: Electronic paper

The invention claimed is:

1. An electronic paper comprising:
a first substrate on which a first electrode is formed and a second substrate on which second electrodes are formed, the first substrate and the second substrate facing to each other, and a plurality of cell spaces which form pixels between the first substrate and the second substrate:
wherein the first substrate is divided into a plurality of first sheet members such that each first sheet member includes a portion of the first electrode and a covering substrate provided above the first sheet member via partitions which separate cell spaces, thereby forming a plurality of sub-sheet structures in which the portion of the first electrode is connected to the portion of the first electrode of the neighboring sub-sheet structure.

2. The electronic paper according to claim 1, wherein each of the sub-sheet structures has a partition layer in which the partitions are formed integrally.

3. The electronic paper according to claim 2, wherein the first electrode is provided so as to extend to the outside of the partition layer and the first electrode extended to the outside of the partition layer is connected to the first electrode of the neighboring sub-sheet structure in the each of the sub-sheet structures.

4. The electronic paper according to claim 3, wherein the first electrode extending to the outside of the partition layer is bent to a side opposite to the second substrate and the first electrode extended to the outside of the partition layer is connected to the first electrode of the neighboring sub-sheet structure through the bent portion.

5. The electronic paper according to claim 1, wherein the first substrate has an area larger than that of the covering substrate in each of the sub-sheet structures.

6. The electronic paper according to claim 1, wherein between the neighboring sub-sheet structures, a distance between the partition layer of one sub-sheet structure and the partition layer of the other sub-sheet structure is set to a value within a range 2 to 5 times as a thickness of the first substrate.

7. The electronic paper according to claim 1, wherein between the neighboring sub-sheet structures, the first electrodes are electrically connected to each other via conductive particles or a metal.

8. The electronic paper according to claim 1, wherein the second substrate is made of a single piece of substrate sheet having translucency.

9. The electronic paper according to claim 1, wherein the covering substrates are made of a material having the translucency.

10. The electronic paper according to claim 1, wherein the first substrate, the second substrate, and the covering substrates are made of a flexible substrate, respectively.

11. The electronic paper according to claim 1, wherein the first electrodes and the second electrodes are wired in parallel, respectively, and are orthogonal to each other.

12. A method for producing an electronic paper comprising:
a step (A) of forming the sub-sheet structures, the step (A) comprising the following steps (a1) to (a4):
a step (a1) of preparing a plurality of sheet members is prepared and forming a first electrode on a main surface of each sheet member, thereby preparing the first sheet members;
a step (a2) of forming partitions which form a plurality of cell spaces on one surface of each first sheet member;
a step (a3) of charging powder particles into cell spaces enclosed by each first sheet member and the partitions; and
a step (a4) of enclosing the charged powder particles within the cell spaces such that the covering substrate is bonded above the corresponding first sheet member via the partitions;
a step (B) of preparing a second substrate including second electrodes formed thereon and arranging the plurality of sub-sheet structures thereon side by side such that the covering substrates of the sub-sheet structures face to the second substrate; and
a step (C) of electrically connecting the first electrode of the sub-sheet structure to the first electrode of the neighboring sub-sheet structure.

13. The method for producing the electronic paper according to claim 12, wherein the step (B) is performed after the step (C).

14. The method for producing the electronic paper according to claim 12, wherein the step (B) is performed before the step (C).

15. The method for producing the electronic paper according to claim 12, wherein the step (a2) further includes forming a partition layer including the partitions integrally formed on the partition layer.

16. The method for producing the electronic paper according to claim 12, wherein the step (A) further includes forming each first electrode so as to extend to the outside of the partition formed outermost position and the step (C) further includes electrically connecting the outwardly extending first electrode to the first electrode of the neighboring sub-sheet structure.

17. The method for producing the electronic paper according to claim 16, wherein the step (A) includes arranging each covering substrate such that end portions of the covering substrate are positioned inside the outwardly extending first electrode and the step (C) includes bending a portion of each first sheet member positioned outside the end of the covering substrate is bent in a side opposite to the second substrate and the first electrode is electrically connected to the first electrode of the neighboring sub-sheet structure through the bent portion.

18. The method for producing the electronic paper according to claim 17, wherein the step (B) further includes arranging the plurality of neighboring sub-sheet structures side by side on the second substrate with the connecting portions formed on the sub-sheet structures being bent to the outside.

19. The method for producing the electronic paper according to claim 18, wherein the step (B) includes arranging the plurality of sub-sheet structures side by side on the second substrate with an electrically-conductive adhesive member being applied to the connecting portion and with the connecting portion being bent outwardly.

20. The method for producing the electronic paper according to claim 12, wherein the step (B) includes arranging the sub-sheet structures such that a distance between the neighboring sub-sheet structures becomes a value 2 to 5 times as a thickness of the first sheet member.

* * * * *